(12) United States Patent
Liu et al.

(10) Patent No.: US 11,437,655 B2
(45) Date of Patent: Sep. 6, 2022

(54) LONG-CHAIN SURFACTANTS FOR IMPROVING BATTERY PERFORMANCE

(71) Applicant: Energizer Brands, LLC, St. Louis, MO (US)

(72) Inventors: Zhufang Liu, Westlake, OH (US); Dawn Marie Freeman, Westlake, OH (US)

(73) Assignee: Energizer Brands, LLC, St. Louis, MO (US)

( * ) Notice: Subject to any disclaimer, the term of this patent is extended or adjusted under 35 U.S.C. 154(b) by 631 days.

(21) Appl. No.: 15/922,530

(22) Filed: Mar. 15, 2018

(65) Prior Publication Data

US 2019/0288346 A1 Sep. 19, 2019

(51) Int. Cl.
| | |
|---|---|
| *H01M 10/42* | (2006.01) |
| *H01M 50/403* | (2021.01) |
| *H01M 4/12* | (2006.01) |
| *H01M 4/24* | (2006.01) |
| *H01M 4/26* | (2006.01) |
| *H01M 4/62* | (2006.01) |
| *H01M 6/04* | (2006.01) |
| *H01M 6/50* | (2006.01) |
| *H01M 10/24* | (2006.01) |
| *H01M 10/26* | (2006.01) |
| *H01M 4/02* | (2006.01) |

(52) U.S. Cl.
CPC ......... *H01M 10/4235* (2013.01); *H01M 4/12* (2013.01); *H01M 4/244* (2013.01); *H01M 4/26* (2013.01); *H01M 4/62* (2013.01); *H01M 6/04* (2013.01); *H01M 6/045* (2013.01); *H01M 6/50* (2013.01); *H01M 10/24* (2013.01); *H01M 10/26* (2013.01); *H01M 50/403* (2021.01); *H01M 2004/027* (2013.01); *H01M 2220/30* (2013.01); *H01M 2300/0085* (2013.01)

(58) Field of Classification Search
CPC .................................................. H01M 10/4235
See application file for complete search history.

(56) References Cited

U.S. PATENT DOCUMENTS

| | | | |
|---|---|---|---|
| 4,099,574 A | | 7/1978 | Cooper et al. |
| 4,195,120 A | * | 3/1980 | Rossler ................... H01M 6/06 |
| | | | 429/50 |
| 4,777,100 A | | 10/1988 | Chalilpoyil et al. |
| 5,378,559 A | | 1/1995 | Randell et al. |

(Continued)

FOREIGN PATENT DOCUMENTS

| | | |
|---|---|---|
| CN | 101366135 A | 2/2009 |
| JP | H 04-138667 A | 5/1992 |

(Continued)

OTHER PUBLICATIONS

European Application No. 19163002.9, Extended European Search Report dated Jul. 15, 2019.

(Continued)

*Primary Examiner* — Brian R Ohara
(74) *Attorney, Agent, or Firm* — Alston & Bird LLP

(57) ABSTRACT

Alkaline electrochemical cells are provided, wherein a long-chain surfactant is included in at least one component of the cell in order to delay anode shutdown. Methods for preparing such cells are also provided.

8 Claims, 12 Drawing Sheets

(56) References Cited

U.S. PATENT DOCUMENTS

| | | | | |
|---|---|---|---|---|
| 5,401,590 | A | * | 3/1995 | Chalilpoyil ............ H01M 4/244 |
| | | | | 429/59 |
| 6,759,166 | B2 | | 7/2004 | Wang et al. |
| 6,833,217 | B2 | | 12/2004 | Woodnorth et al. |
| 7,147,678 | B2 | | 12/2006 | Jiang et al. |
| 7,169,504 | B2 | | 1/2007 | Armacanqui et al. |
| 7,179,310 | B2 | | 2/2007 | Jiang et al. |
| 8,003,258 | B2 | | 8/2011 | Issaev et al. |
| 8,043,748 | B2 | | 10/2011 | Geng et al. |
| 8,080,336 | B2 | | 12/2011 | Izumi et al. |
| 2003/0165744 | A1 | | 9/2003 | Schubert et al. |
| 2009/0053595 | A1 | | 2/2009 | Izumi et al. |
| 2009/0202904 | A1 | * | 8/2009 | Geng .................... C01G 53/04 |
| | | | | 429/206 |
| 2012/0107666 | A1 | | 5/2012 | Bailey et al. |
| 2013/0095392 | A1 | * | 4/2013 | Shin .................. H01M 10/0568 |
| | | | | 429/338 |
| 2019/0181504 | A1 | * | 6/2019 | Veith ................ H01M 10/0565 |

FOREIGN PATENT DOCUMENTS

| | | | | |
|---|---|---|---|---|
| JP | 2005-518074 A | | 6/2005 | |
| JP | 2008-034375 A | | 2/2008 | |
| JP | 2011-511429 A | | 4/2011 | |
| WO | WO-2016061276 A1 | * | 4/2016 | ............ H01M 6/045 |
| WO | WO 2016/115016 A1 | | 7/2016 | |
| WO | WO 2016/183373 A1 | | 11/2016 | |

OTHER PUBLICATIONS

Japan Patent Office, Notice of Reasons for Refusal, including Search Report, received for Application No. 2019-033223, dated Jun. 28, 2022, 57 pages, Japan.

* cited by examiner

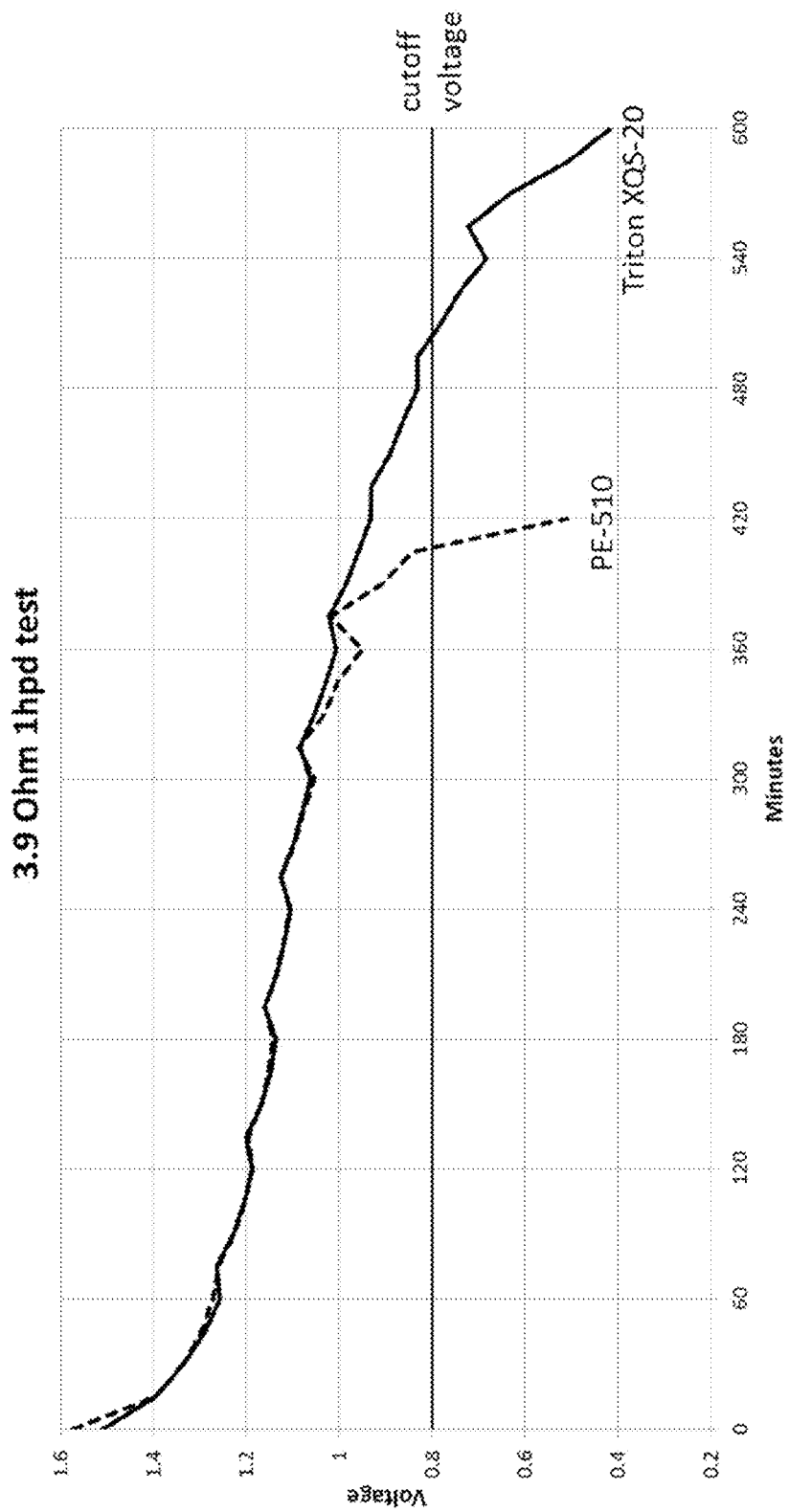

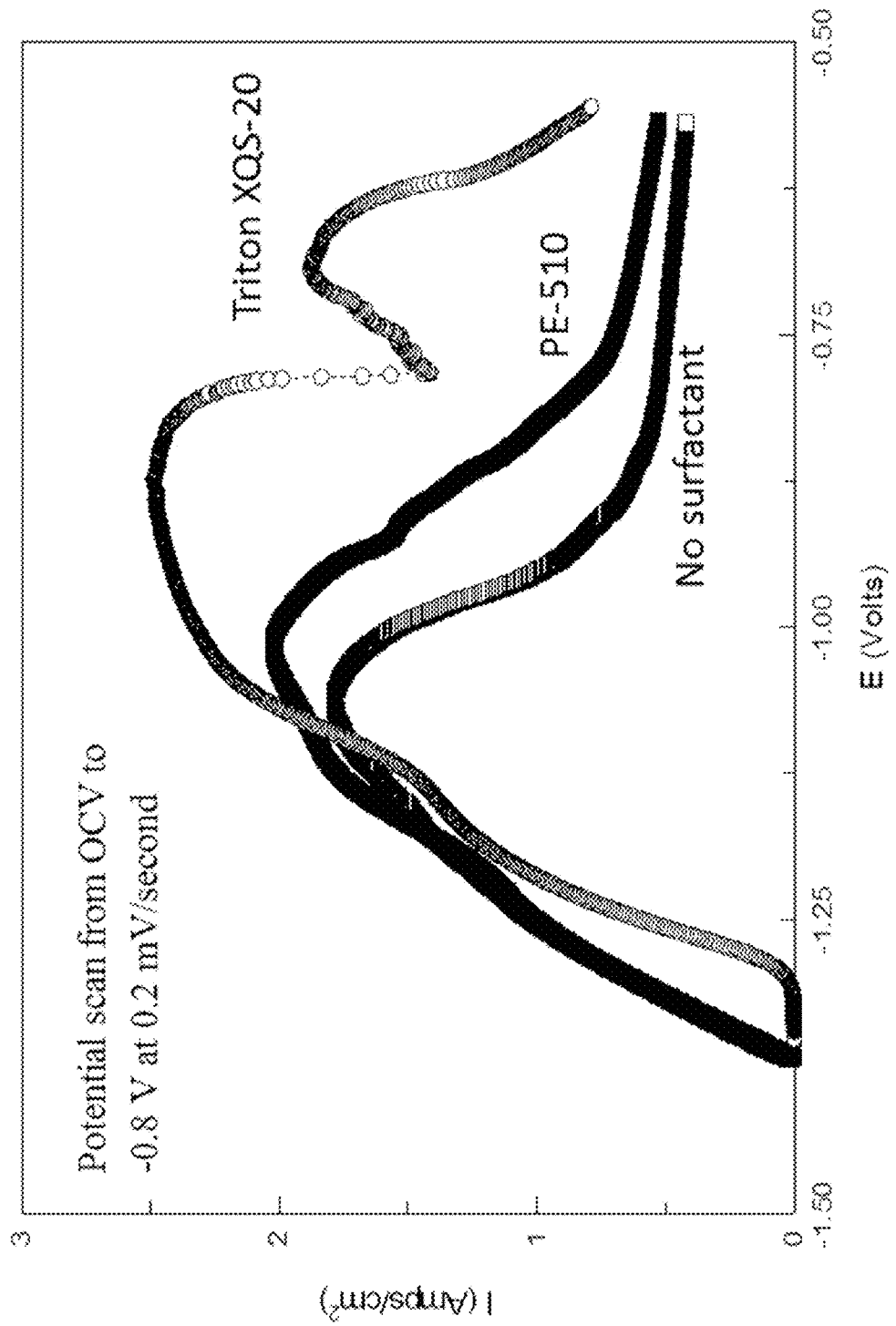

PE-510

Triton XQS-20

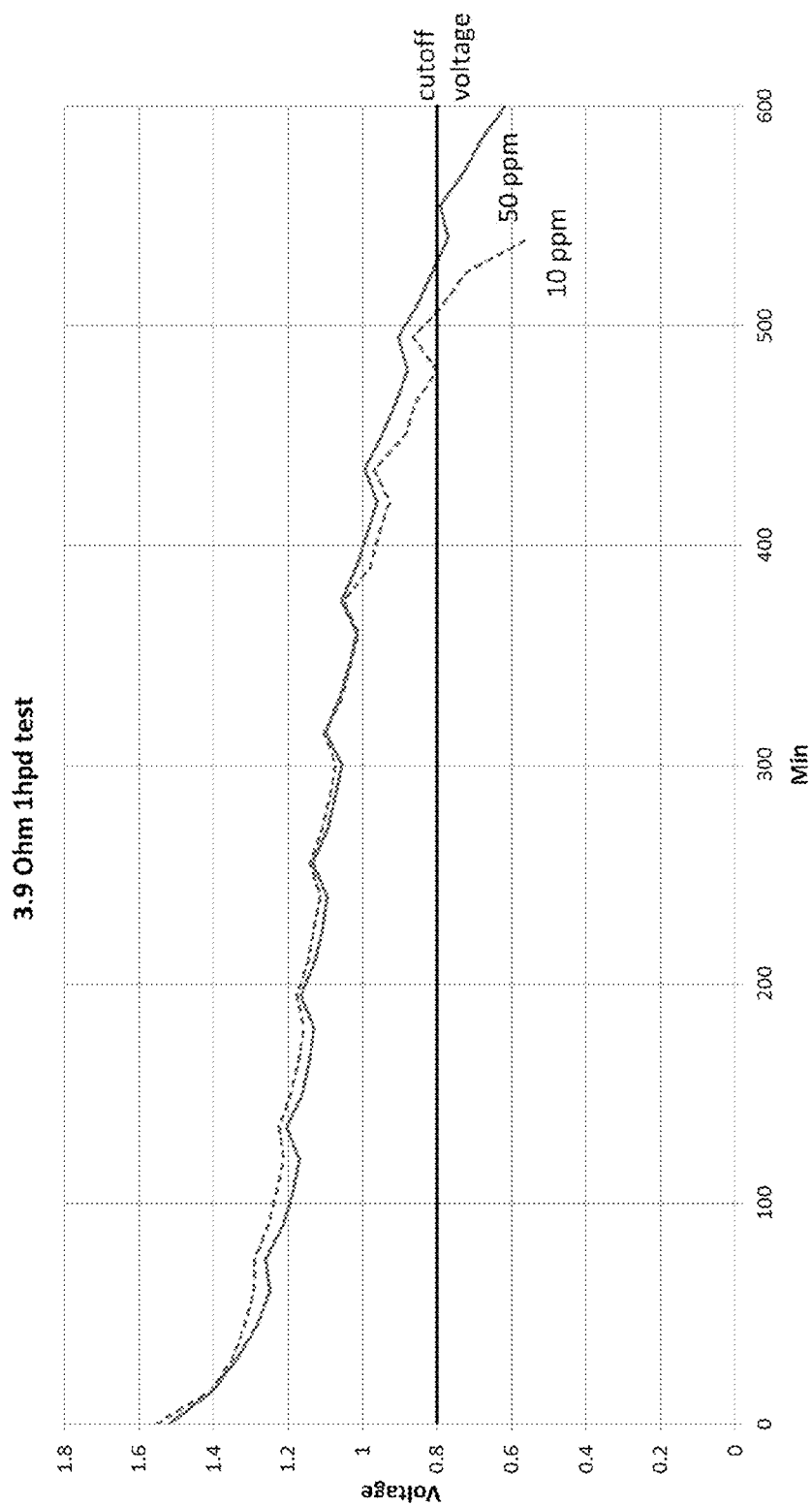

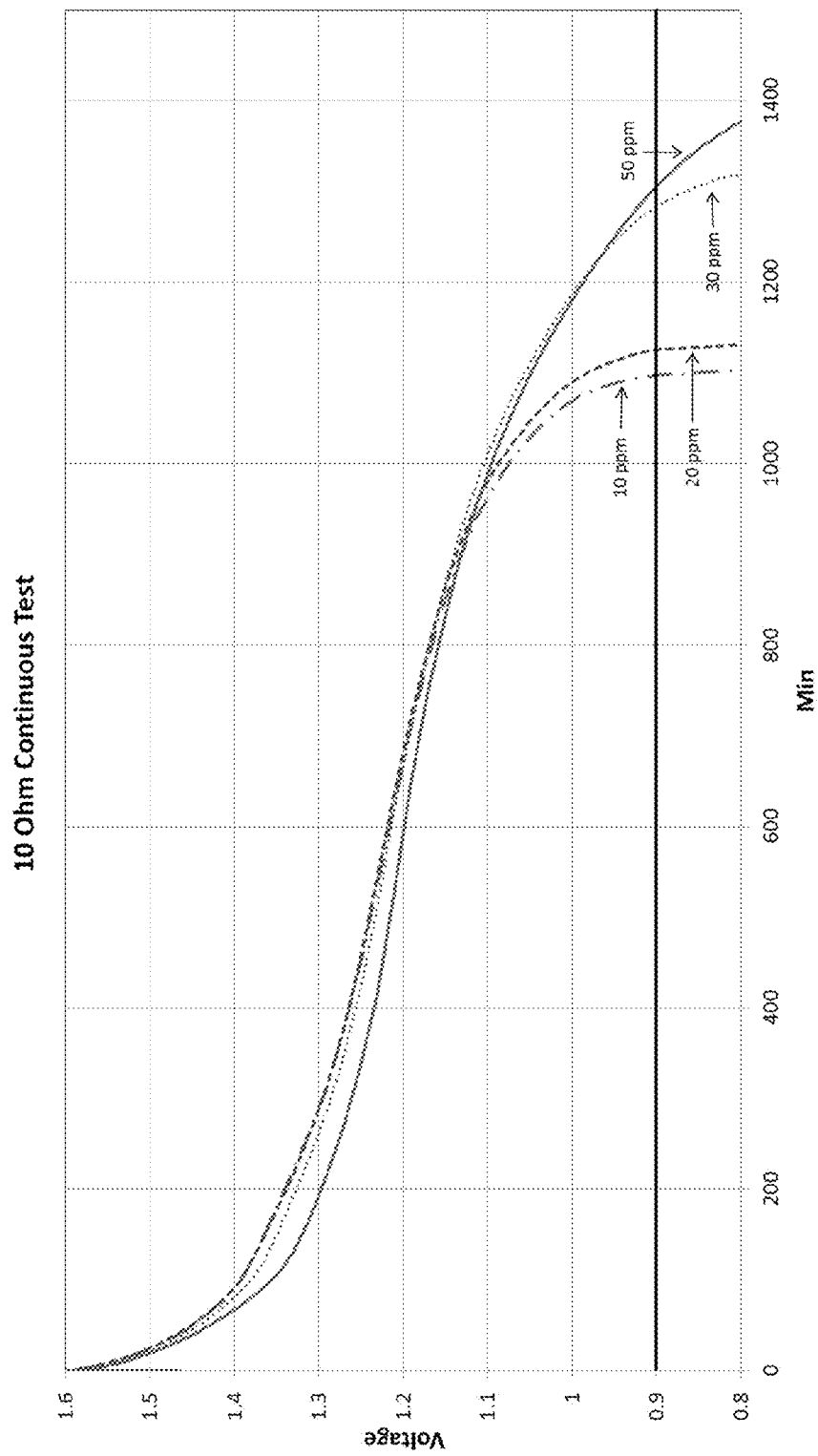

US 11,437,655 B2

LONG-CHAIN SURFACTANTS FOR IMPROVING BATTERY PERFORMANCE

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain.

As the shape and size of the batteries are often fixed, battery manufacturers must modify cell characteristics to provide increased performance. Attempts to address the problem of how to improve a battery's performance in a particular device, such as a digital camera, have usually involved changes to the cell's internal construction. For example, cell construction has been modified by increasing the quantity of active materials utilized within the cell.

Early anode shutdown is one of the major causes of poor service in moderate-drain tests. In anode shutdown, the anode discharge products (i.e. ZnO) passivate the Zn particle surface and block the Zn discharge. In addition, the dense discharge/reaction zone close to the anode/separator interface could also block the $H_2O$ and $OH^-$ transport and cause early anode shutdown. Anode shutdown becomes even more problematic for designs with low anode KOH concentration (i.e. 24-28 Wt. % KOH) or coarse zinc materials.

Generally, anode shutdown can be mitigated by adding more electrolytes in the alkaline cells, but this will reduce the volumetric space for active materials (Zn and $MnO_2$) and negatively impact the cell capacity. Anode shutdown issues can also be mitigated by increasing the concentration of KOH electrolyte, but this will increase the cell leakage rate and the cell direct-short temperature.

It is in an effort to overcome the limitations of the above-described cells, and other such cells, that the present embodiments were designed.

BRIEF SUMMARY

An embodiment is an alkaline electrochemical cell, comprising:
 a) a container; and
 b) an electrode assembly disposed within the container and comprising a cathode, an anode, a separator located between the cathode and the anode, an alkaline electrolyte solution, and a long-chain surfactant.

An embodiment is a method of producing the above-described electrochemical cell, wherein the anode comprises the long-chain surfactant, said method comprising combining the long-chain surfactant with i) anode dry mix containing Zn powder and ii) gelled electrolyte, or with anode paste comprising Zn and gelled electrolyte.

An embodiment is a method of producing the above-described electrochemical cell, wherein the anode comprises the long-chain surfactant, comprising the steps:

i) 1) adding the long-chain surfactant to anode dry mix containing Zn powder; and
    2) blending the anode dry mix with gelled electrolyte;
  or
 ii) 1) adding the long-chain surfactant to gelled electrolyte; and
    2) blending anode dry mix comprising Zn with the gelled electrolyte;
  or
 iii) 1) adding the long-chain surfactant to anode paste comprising Zn and gelled electrolyte;
  or
 iv) 1) adding the long-chain surfactant into electrolyte;
    2) blending the gelling agent and electrolyte to as to form a gelled electrolyte; and
    3) blending anode dry mix comprising Zn with the gelled electrolyte.

An embodiment is a method of producing the above-described electrochemical cell, wherein the separator comprises the long-chain surfactant, comprising the step of
 i) dipping the separator in a solution comprising the long-chain surfactant; or
 ii) spraying a solution comprising the long-chain surfactant on at least one layer of separator.

BRIEF SUMMARY OF THE DRAWINGS

FIG. 3 shows 3.9 ohm 1 hpd (1 hr/day) discharge curves of cells with PE-510 surfactant and Triton XQS-20 surfactant in the anode.

FIG. 4 shows the potentiodynamic scans of anode half-cells with 50 ppm Triton XQS-20 surfactant and 20 ppm PE-510 surfactant in the anode, as well as an anode half-cell with no surfactant in the anode.

FIG. 11 shows 3.9 ohm 1 hpd discharge curves for cells with 10 ppm and 50 ppm of Triton XQS-20 surfactant in the anode.

FIG. 12 shows 10 ohm continuous discharge curves of cells with different levels of Triton XQS-20 surfactant in the anodes.

DETAILED DESCRIPTION AND DISCUSSION

Figure 1:
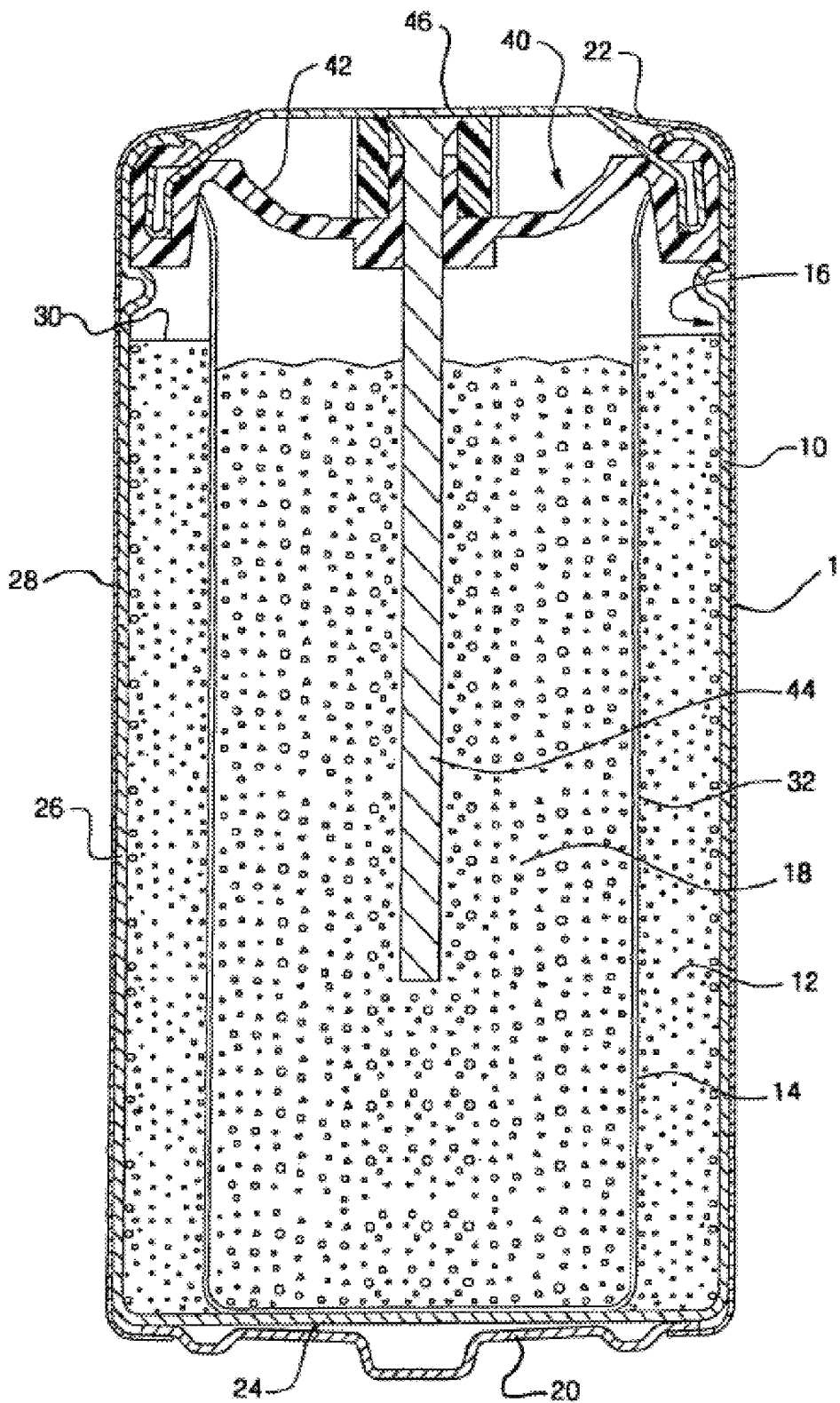
FIG. 1 is a cross-sectional elevational view of an alkaline electrochemical cell of an embodiment.

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item. For example, "a long-chain surfactant" may refer to two or more long-chain surfactants.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%.

As used herein, "about" in the context of a numerical value or range means within ±10% of the numerical value or range recited or claimed.

As used herein, "synergistic," in terms of an effect, refers to the case where an electrochemical cell comprising two long-chain surfactants (LCS1 and LCS2) exhibits a greater improvement in specific capacity, runtime, or some other property or metric of performance, compared to an electrochemical cell lacking the long-chain surfactants than would be expected based on the improvements exhibited by two electrochemical cells, one comprising LCS1 and one comprising LCS2.

As used herein, "improvement" with respect to specific capacity means that the specific capacity is increased. Generally, an "improvement" of a property or metric of performance of a material or electrochemical cell means that the property or metric of performance differs (compared to that of a different material or electrochemical cell) in a manner that a user or manufacturer of the material or cell would find desirable (i.e. costs less, lasts longer, provides more power, more durable, easier or faster to manufacture, etc.).

As used herein, "specific capacity" refers to the total amount of charge in an electrochemical cell when discharged at a particular rate. This is typically measured in ampere hours.

As used herein, "run-time" refers to the length of time that an electrochemical cell will be able to provide a certain level of charge.

As used herein, "long-chain surfactant" refers to a surfactant comprising a hydrophobic group and a hydrophobic group, connected to each other by a polymeric chain.

As used herein, "hydrophobic" refers to a molecule or group that repels water, does not readily dissolve in water, and/or is non-polar.

As used herein, "hydrophilic" refers to a molecule or group that is attracted to water, readily dissolves in water, and/or is polar.

It is to be understood that tests of the form x mA y hr/z hr mean that the cell is under a discharge load of x mA for a period of y hours, then at rest for z–y hours, then the cycle is started again. For example, a 50 mA 1 hr/8 hr test means that a cell is under a 50 mA discharge load for 1 hour, then at rest for 7 hours, followed by the cycle starting again. It is also to be understood that "continuous" tests have no rest period.

An embodiment is an alkaline electrochemical cell, comprising:
a) a container; and
b) an electrode assembly disposed within the container and comprising a cathode, an anode, a separator located between the cathode and the anode, an alkaline electrolyte solution, and a long-chain surfactant.

In an embodiment, the long-chain surfactant has the structure:

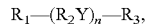

wherein $R_1$ is a hydrophobic group,
$R_2$ is selected from the group consisting of ethylene and propylene,
Y is selected from the group consisting of O and S,
$R_3$ is a hydrophilic group, and
$n \geq 8$.

In an embodiment, $R_1$ is selected from the group consisting of branched or unbranched alkyl, alkenyl, alkynyl, aryl, phenyl, benzyl, phenylalkyl, cycloalkyl, and cycloalkenyl groups. In an embodiment, $R_3$ is selected from the group consisting of phosphate, phosphate ester, sulfate, sulfate ester, sulfonate, carboxylate, amino, thiol, and hydroxyl groups.

In an embodiment, $n \geq 9$, $n \geq 10$, $n \geq 11$, $n \geq 12$, $n \geq 13$, $n \geq 14$, $n \geq 15$, $n \geq 16$, $n \geq 17$, $n \geq 18$, $n \geq 19$, $n \geq 20$, $n \geq 21$, $n \geq 22$, $n \geq 23$, $n \geq 24$, $n \geq 25$, $n \geq 26$, $n \geq 27$, $n \geq 28$, $n \geq 29$, $n \geq 30$, $n \geq 31$, $n \geq 32$, $n \geq 33$, $n \geq 34$, $n \geq 35$, $n \geq 36$, $n \geq 37$, $n \geq 38$, $n \geq 39$, or $n \geq 40$. In another embodiment, $n=9$, $n=10$, $n=11$, $n=12$, $n=13$, $n=14$, $n=15$, $n=16$, $n=17$, $n=18$, $n=19$, $n=20$, $n=21$, $n=22$, $n=23$, $n=24$, $n=25$, $n=26$, $n=27$, $n=28$, $n=29$, $n=30$, $n=31$, $=32$, $n=33$, $n=34$, $n=35$, $n=36$, $n=37$, $n=38$, $n=39$, or $n=40$. In another embodiment, $n \leq 9$, $n \leq 10$, $n \leq 11$, $n \leq 12$, $n \leq 13$, $n \leq 14$, $n \leq 15$, $n \leq 16$, $n \leq 17$, $n \leq 18$, $n \leq 19$, $n \leq 20$, $n \leq 21$, $n \leq 22$, $n \leq 23$, $n \leq 24$, $n \leq 25$, $n \leq 26$, $n \leq 27$, $n \leq 28$, $n \leq 29$, $n \leq 30$, $n \leq 31$, $\leq 32$, $n \leq 33$, $n \leq 34$, $n \leq 35$, $n \leq 36$, $n \leq 37$, $n \leq 38$, $n \leq 39$, or $n \leq 40$.

In an embodiment, $R_2$ is ethylene and Y is O. In an embodiment, $R_1$ is a phenylalkyl group. In an embodiment, $R_3$ is a phosphate ester group. In an embodiment, $R_2$ is ethylene, Y is O, $R_1$ is a phenylalkyl group, and $R_3$ is a phosphate ester group. In an embodiment, the long-chain surfactant has the structure

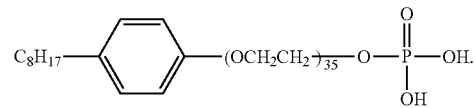

In an embodiment, the anode comprises the long-chain surfactant. In an embodiment, the separator comprises the long-chain surfactant.

In an embodiment, the electrochemical cell is a primary, or disposable, cell. In an embodiment, the electrochemical cell is a secondary, or rechargeable, cell.

In an embodiment, the long-chain surfactant is present in the separator. In an embodiment, the long-chain surfactant is in a solution which is sprayed onto the separator. In an embodiment, the separator is dipped into a solution comprising the long-chain surfactant. In an embodiment, the long-chain surfactant is present in the separator in an amount of 3-5000 µg/in$^2$, or 20-4000 µg/in$^2$, or 50-3000 µg/in$^2$, or 100-2000 µg/in$^2$, or 500-1000 µg/in$^2$, or 3-100 µg/in$^2$, or 100-500 µg/in$^2$, or 500-1000 µg/in$^2$, or 1000-2000 µg/in$^2$, or 2000-3000 µg/in$^2$, or 3000-4000 µg/in$^2$, or 4000-5000 µg/in$^2$. It is understood that "in$^2$" refers to the surface area of the separator. In an embodiment, the long-chain surfactant is in the separator in an amount of ≥3 µg/in$^2$, ≥10 g/in$^2$, ≥25 µg/in$^2$, ≥50 µg/in$^2$, ≥100 µg/in$^2$, ≥500 µg/in$^2$, ≥1000 µg/in$^2$, ≥2000 µg/in$^2$, ≥3000 µg/in$^2$, or ≥4000 µg/int. In an embodiment, the long-chain surfactant is in the separator in an amount of ≤5 µg/in$^2$, ≤10 µg/in$^2$, ≤25 µg/in$^2$, ≤50 µg/in$^2$, ≤100 µg/in$^2$, ≤500 µg/in$^2$, ≤1000 µg/in$^2$, 2000 µg/in$^2$, ≤3000 µg/in$^2$, ≤4000 µg/in$^2$, or ≤5000 µg/in$^2$.

In an embodiment, the anode comprises an active material selected from the group consisting of zinc, magnesium, aluminum, and silicon.

In an embodiment, the anode comprises the long-chain surfactant in a concentration of 1-15,000 ppm, or 10-10,000 ppm, or 20-5,000 ppm, or 50-2,000 ppm, or 100-1,000 ppm, or 200-500 ppm, relative to the weight of the active ingredient of the anode or to the total weight of the anode.

In an embodiment, the anode comprises the long-chain surfactant in a concentration of ≥10 ppm, ≥15 ppm, ≥20 ppm, ≥25 ppm, ≥30 ppm, ≥35 ppm, ≥40 ppm, ≥45 ppm, ≥50 ppm, ≥55 ppm, ≥60 ppm, ≥65 ppm, ≥70 ppm, ≥75 ppm, ≥80 ppm, ≥85 ppm, ≥90 ppm, ≥95 ppm, or ≥100 ppm, relative to the weight of the active ingredient of the anode or to the total weight of the anode.

In an embodiment, the anode comprises the long-chain surfactant in a concentration of ≤10 ppm, ≤15 ppm, ≤20 ppm, ≤25 ppm, ≤30 ppm, ≤35 ppm, ≤40 ppm, ≤45 ppm, ≤50 ppm, 55 ppm, ≤60 ppm, ≤65 ppm, ≤70 ppm, ≤75 ppm, ≤80 ppm, ≤85 ppm, ≤90 ppm, ≤95 ppm, or ≤100 ppm, relative to the weight of the active ingredient of the anode or to the total weight of the anode.

In an embodiment, the anode comprises the long-chain surfactant in a concentration of about 10 ppm, about 15 ppm, about 20 ppm, about 25 ppm, about 30 ppm, about 35 ppm, about 40 ppm, about 45 ppm, about 50 ppm, about 55 ppm, about 60 ppm, about 65 ppm, about 70 ppm, about 75 ppm, about 80 ppm, about 85 ppm, about 90 ppm, about 95 ppm, or about 100 ppm, relative to the weight of the active ingredient of the anode or to the total weight of the anode In an embodiment, the electrolyte solution comprises potassium hydroxide (KOH), sodium hydroxide (NaOH), lithium hydroxide (LiOH), magnesium hydroxide ($Mg(OH)_2$), $Ca(OH)_2$, magnesium perchlorate ($Mg(ClO_4)_2$), magnesium chloride ($MgCl_2$), or magnesium bromide ($MgBr_2$).

In an embodiment, the alkaline electrochemical cell comprises two or more long-chain surfactants.

In an embodiment, the electrochemical cell has a specific capacity or runtime that is greater than that of a similar alkaline electrochemical cell which lacks a long-chain surfactant. In a further embodiment, the specific capacity or runtime is from 1% greater to 100% greater, or from 5% greater to 90% greater, or from 10% greater to 80% greater, or from 15% greater to 70% greater, or from 20% greater to 60% greater, or from 25% greater to 50% greater, or from 30% greater to 40% greater. In an embodiment, the alkaline electrochemical cell comprises two or more long-chain surfactants, and the increase in specific capacity is synergistic.

In an embodiment, the voltage is 0.1 V-2.0 V, 0.2 V-1.9 V, 0.3 V-1.8 V, 0.4 V-1.7 V, 0.5 V-1.6 V, 0.6 V-1.5 V, 0.7 V-1.4 V, 0.8 V-1.3 V, 0.9 V-1.2 V, 1.0 V-1.1 V, or is equal to, greater than, or less than 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, or 2.0 V.

An embodiment is a method of producing any of the above-described electrochemical cells, wherein the anode comprises the long-chain surfactant, said method comprising the step of combining the long-chain surfactant with i) anode dry mix containing Zn powder and ii) gelled electrolyte, or with anode paste comprising Zn and gelled electrolyte.

An embodiment is a method of producing any of the above-described electrochemical cells, wherein the anode comprises the long-chain surfactant, said method comprising the steps:
i) 1) adding the long-chain surfactant to anode dry mix containing Zn powder; and
2) blending the anode dry mix with gelled electrolyte;
or
ii) 1) adding the long-chain surfactant to gelled electrolyte; and
2) blending anode dry mix comprising Zn with gelled electrolyte;
or
iii) 1) adding the long-chain surfactant to anode paste comprising Zn and gelled electrolyte;
or
iv) 1) adding the long-chain surfactant into electrolyte;
2) blending the gelling agent and electrolyte so as to form gelled electrolyte; and
3) blending anode dry mix comprising Zn with the gelled electrolyte.

In a further embodiment, the long-chain surfactant is in a solution prior to the addition.

An embodiment is a method of producing any of the above-described electrochemical cells, wherein the separator comprises the long-chain surfactant, comprising the steps of
i) dipping the separator in a solution comprising the long-chain surfactant; or
ii) spraying a solution comprising the long-chain surfactant on at least one layer of separator.

In a further embodiment, the solution is sprayed on the at least one layer of separator while the separator is inside the cell container.

The embodiments will be better understood by reference to FIG. 1 which shows a cylindrical cell 1 in elevational cross-section, with the cell having a nail-type or bobbin-type construction and dimensions comparable to a conventional LR6 (AA) size alkaline cell, which is particularly well-suited to the embodiments. However, it is to be understood that cells according to the embodiments can have other sizes and shapes, such as a prismatic or button-type shape; and electrode configurations, as known in the art. The materials and designs for the components of the electrochemical cell illustrated in FIG. 1 are for the purposes of illustration, and other materials and designs may be substituted. Moreover, in certain embodiments, the cathode and anode materials may be coated onto a surface of a separator and/or current collector and rolled to form a "jelly roll" configuration.

In FIG. 1, an electrochemical cell 1 is shown, including a container or can 10 having a closed bottom end 24, a top end 22 and sidewall 26 there between. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, solid zinc oxide, and a surfactant. The negative electrode can optionally include other additives, for example a binder or a gelling agent, and the like.

Zinc is an example main active material for the negative electrode of the embodiments. Mercury and magnesium may also be used. Preferably, the volume of active material utilized in the negative electrode is sufficient to maintain a desired particle-to-particle contact and a desired anode to cathode (A:C) ratio.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

Zinc suitable for use in the embodiments may be purchased from a number of different commercial sources under various designations, such as BIA 100, BIA 115. Umicore, S. A., Brussels, Belgium is an example of a zinc supplier. In a preferred embodiment, the zinc powder generally has 25 to 40 percent fines less than 75 µm, and preferably 28 to 38 percent fines less than 75 µm. Generally lower percentages of fines will not allow desired DSC service to be realized and utilizing a higher percentage of fines can lead to increased gassing. A correct zinc alloy is needed in order to reduce negative electrode gassing in cells and to maintain test service results.

The aqueous alkaline electrolyte comprises an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 26 to about 36 weight percent, for example from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service. The electrolyte may comprise an additive. This additive may be present at a concentration of, for example, 1-50,000 ppm.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount of gelling agent present is chosen so that lower rates of electrolyte separation are obtained, and anode viscosity and yield stress are not too great, which can lead to problems with anode dispensing.

Other components which may be optionally present within the negative electrode include, but are not limited to, gassing inhibitors, organic or inorganic anticorrosive agents, plating agents, binders, or additional surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 m$^2$/g or less measured utilizing a Tristar 3000 BET specific surface area analyzer from Micromeritics® having a multi-point calibration after the zinc oxide has been degassed for one hour at 150° C.; and a particle size D50 (mean diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge. The additional surfactant may be nonionic, or anionic, or a combination thereof.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

In one embodiment, the zinc and solid zinc oxide powders, and other optional powders other than the gelling agent, are combined and mixed. Afterwards, the surfactant is introduced into the mixture containing the zinc and solid zinc oxide. A pre-gel comprising alkaline electrolyte, soluble zinc oxide and gelling agent, and optionally other liquid components, are introduced to the surfactant, zinc and solid zinc oxide mixture which are further mixed to obtain a substantially homogenous mixture before addition to the cell. Alternatively, in a further preferred embodiment, the solid zinc oxide is predispersed in a negative electrode pre-gel comprising the alkaline electrolyte, gelling agent, soluble zinc oxide and other desired liquids, and blended, such as for about 15 minutes. The solid zinc oxide and surfactant are then added and the negative electrode is blended for an additional period of time, such as about 20 minutes. The amount of gelled electrolyte utilized in the negative electrode is generally from about 25 to about 35 weight percent, and for example, about 32 weight percent based on the total weight of the negative electrode. Volume percent of the gelled electrolyte may be about 70% based on the total volume of the negative electrode. In addition to the aqueous alkaline electrolyte absorbed by the gelling agent during the negative electrode manufacturing process, an additional quantity of an aqueous solution of alkaline metal hydroxide, i.e., "free electrolyte", may also be added to the cell during the manufacturing process. The free electrolyte may be incorporated into the cell by disposing it into the cavity defined by the positive electrode or negative electrode, or combinations thereof. The method used to incorporate free electrolyte into the cell is not critical provided it is in contact with the negative electrode, positive electrode, and separator. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted. The remaining portion of the 29 weight percent KOH solution is injected into the separator lined cavity after the negative electrode has been inserted.

Second electrode 12, also referred to herein as the positive electrode or cathode, may include EMD as the electrochemically active material. In other embodiments, the cathode material may be silver oxide ($Ag_2O$) or nickel oxyhydroxide (NiOOH). EMD is present in an amount generally from about 80 to about 86 weight percent and preferably from about 81 to 85 weight percent by weight based on the total weight of the positive electrode, i.e., manganese dioxide, conductive material, positive electrode electrolyte and additives, including organic additive(s), if present. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 1. Alternatively, the positive electrode may be formed by pre-forming a plurality of rings from the mixture comprising EMD, and optionally, additive(s), and then inserting the rings into the container to form the tubular-shaped second electrode. The cell shown in FIG. 1 would typically include 3 or 4 rings.

The positive electrode can include other components such as a conductive material, for example graphite, that when mixed with the EMD provides an electrically conductive matrix substantially throughout the positive electrode. Conductive material can be natural, i.e., mined, or synthetic, i.e., manufactured. In one embodiment, the cells include a positive electrode having an active material or oxide to carbon ratio (O:C ratio) that ranges from about 12 to about 14. Too high of an oxide to carbon ratio decreases the container to cathode resistance, which affects the overall cell resistance and can have a potential effect on high rate tests, such as the DSC test, or higher cut-off voltages. Furthermore the graphite can be expanded or non-expanded. Suppliers of graphite for use in alkaline batteries include Timcal America of Westlake, Ohio; Superior Graphite Company of Chicago, Ill.; and Lonza, Ltd. of Basel, Switzerland. Conductive material is present generally in an amount from about 5 to about 10 weight percent based on the total weight of the positive electrode. Too much graphite can reduce EMD input, and thus cell capacity; too little graphite can increase container to cathode contact resistance and/or bulk cathode resistance. An example of an additional additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In one embodiment, the positive electrode component (EMD), conductive material, and barium sulfate, and optionally additive(s) are mixed together to form a homogeneous mixture. During the mixing process, an alkaline electrolyte solution, such as from about 37% to about 40% KOH solution, optionally including organic additive(s), is evenly dispersed into the mixture thereby insuring a uniform distribution of the solution throughout the positive electrode materials. The mixture is then added to the container and molded utilizing a ram. Moisture within the container and positive electrode mix before and after molding, and components of the mix are preferably optimized to allow quality positive electrodes to be molded. Mix moisture optimization allows positive electrodes to be molded with minimal splash and flash due to wet mixes, and with minimal spalling and excessive tool wear due to dry mixes, with optimization helping to achieve a desired high cathode weight. Moisture content in the positive electrode mixture can affect the overall cell electrolyte balance and has an impact on high rate testing.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $MnO_2$ in the positive electrode or cathode, the A:C ratio may be greater than 1.32:1, such as greater than 1.34:1, and specifically 1.36:1 for impact molded positive electrodes. The A:C ratio for ring molded positive electrodes can be lower, such as about 1.2:1 to about 1.1:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

EXAMPLES AND DISCUSSION

Example 1—Moderate Drain Service Tests

Three different long-chain surfactants, each having an ethoxylate chain of the formula $(OCH_2CH_2)x$, where x is not less than 8, were added to zinc anodes in a cell, to test the effect of the different surfactants on moderate-drain service (3.9 ohm 1 hpd and 250 mA 1 hpd). 10-200 ppm (vs. the Zn weight) of surfactant was added to the anode. The surfactants tested were Triton X-165 (x=16), Triton X-305 (x=30), and Triton XQS-20 (x=35), all obtained from the Dow Chemical Company (Midland, Mich.). PE-510 (x=6) was used as a control, and was obtained from Solvay, S.A. (Brussels, Belgium).

Figure 2:
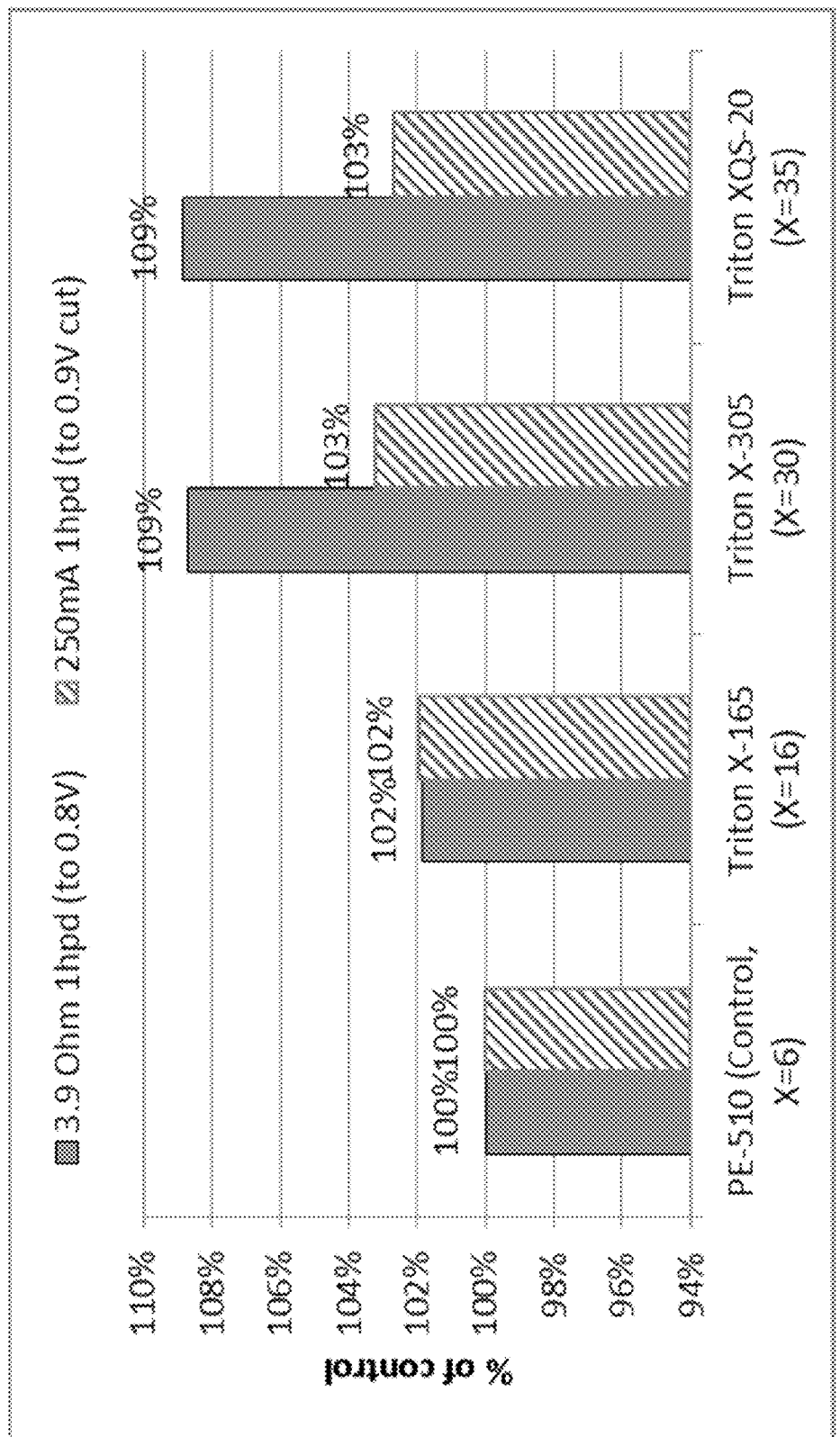
FIG. 2 shows results from two different moderate-drain service tests using cells prepared with surfactants having different ethoxylate chain lengths.

The results of the 3.9 ohm 1 hpd and 250 mA 1 hpd tests are summarized in FIG. 2. Both the 3.9 ohm 1 hpd and 250 mA 1 hpd tests showed an improvement from the control surfactant to the Triton X-165 surfactant to the Triton X-305 and Triton XQS-20 surfactant.

The surfactants are used to delay the anode shutdown during discharge and improve the moderate-drain service. It is believed that the long-chain surfactants delay the anode shutdown by changing the morphology of anode discharge products or allowing uniform anode discharge across the anode.

Example 2—Triton XQS-20 and Zinc Anode Analysis

As found in the previous Example, Triton XQS-20 surfactant is able to improve the characteristics of batteries in moderate drain tests, and is believed to do so by delaying anode shutdown. This surfactant was examined in additional tests.

Triton XQS-20 is a phosphate ester surfactant having the following structure:

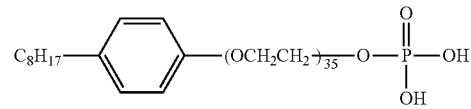

Triton XQS-20 has a hydrophobic octylphenyl tail. The hydrophilic part is the phosphate group. The ethoxylate chain comprises 35 ethyoxylate units, and its hydrophilicity increases with increasing ethoxylate chain length.

Cells were prepared with 50 ppm Triton XQS-20 in zinc anodes (where 50 ppm is relative to the total Zn weight), with cells comprising 20 ppm PE-510 in the anode, as well as a cell lacking any surfactant in the anode, as controls. As shown in discharge curves (FIG. 3), the Triton XQS-20 surfactant significantly improves the 3.9 ohm 1 hpd service, compared to the PE-510 cell, because it delays anode shutdown. A similar trend was observed in the potentiodynamic scans of the anode half cells (FIG. 4). The cells with 50 ppm of Triton XQS-20 surfactant exhibited delayed anode shutdown (decay of anode discharge current) compared to the cells with 20 ppm of PE-510 or without surfactant.

Impact of Surfactants on Anode Discharge Pattern/Uniformity

Figure 5A:
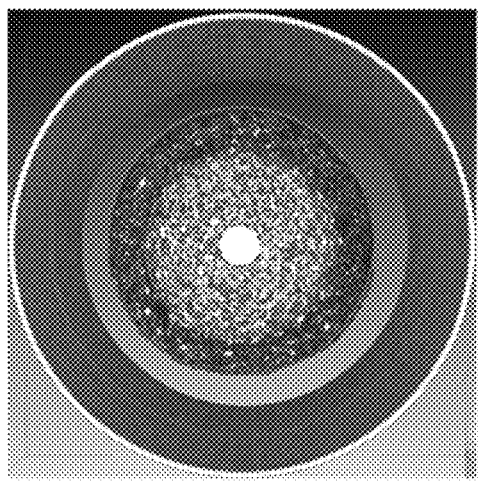
FIGS. 5a and 5b show CT scans of cells after 420 minutes discharge in 3.9 ohm 1 hpd test.
Figure 5B:
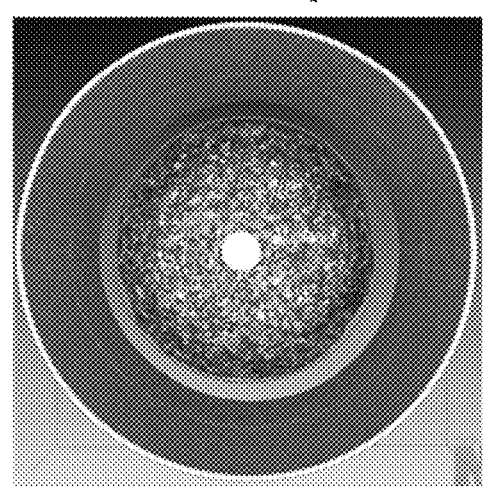

To investigate the possibility that the surfactant delays anode shutdown by improving the anode discharge uniformity, the cells were first discharged for 420 minutes on the 3.9 ohm 1 hpd test. Then, a CT scan was used to examine the anode discharge uniformity. As shown in FIG. 5a, a dense ZnO layer (shown as a dark ring) formed at the region close to the anode/separator interface for the cells with PE-510 surfactant. A dense ZnO layer was also observed for the cells with Triton XQS-20 surfactant (FIG. 5b), but the distribution of ZnO is more uniform across the anode. It is known that the discharge starts with the anode/separator interface; however, with the presence of Triton XQS-20 surface in the anode, the anode discharge is extended further away from the separator/anode interface to support a certain discharge rate, due to the suppression of Triton XQS-20 surfactant on Zn discharge.

Requirements of a Surfactant for Delaying Anode Shutdown

As discussed above, the Triton XQS-20 surfactant plays a critical role in delaying anode shutdown due to its suppression of anode discharge. It is important to understand why the Triton XQS-20 surfactant suppresses anode discharge. The long ethoxylate chain is a unique feature associated with Triton XQS-20 surfactant. To confirm that the ethoxylate chain length is a key parameter impacting the effectiveness of delaying anode shutdown, a related surfactant, Triton QS-44 (Dow Chemical Co., Midland, Mich.), was selected for this study. The structure of Triton QS-44 is shown below:

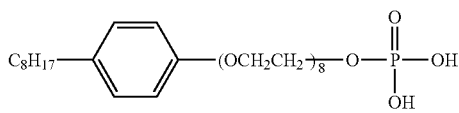

QS-44 has similar molecular structure as XQS-20 but with a much shorter chain length (a total of 8 ethoxylate units). These two surfactants can be used to study the impact of chain length on anode discharge.

Figure 6:
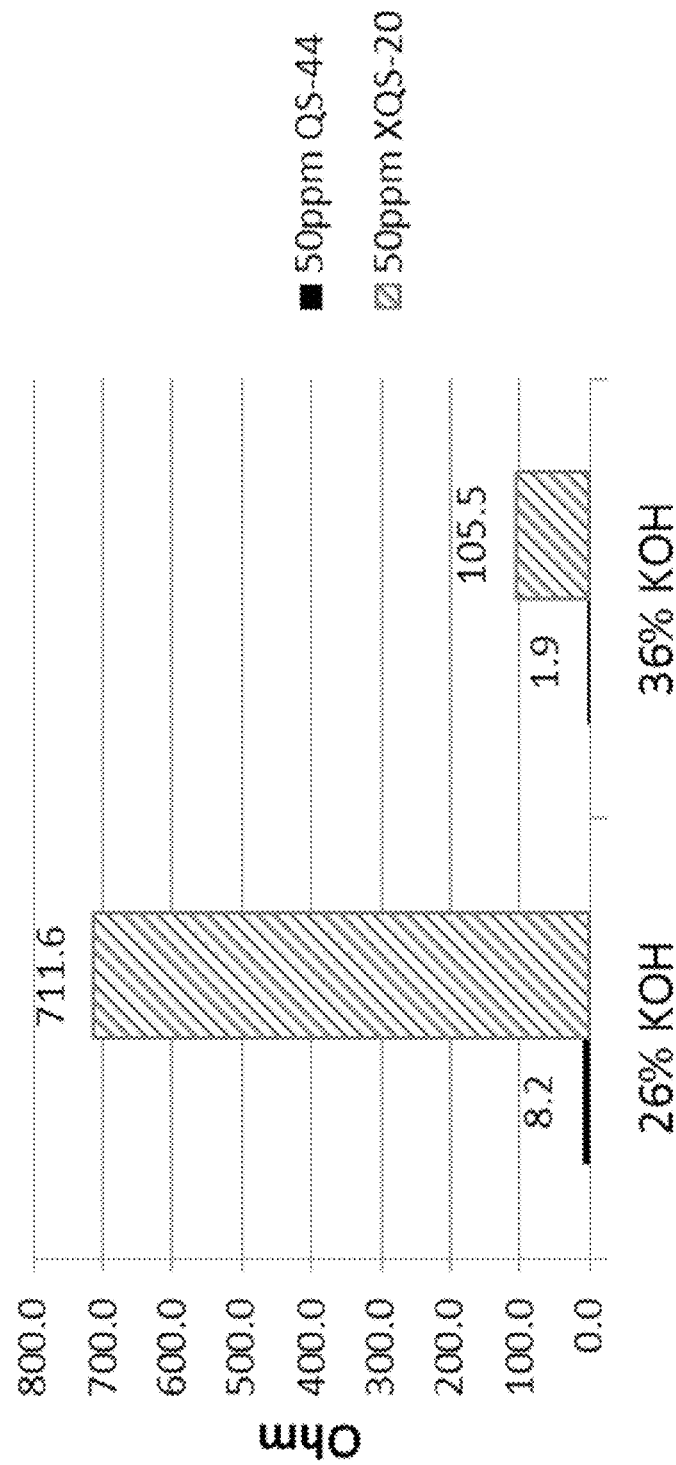
FIG. 6 shows charger transfer (CT) resistance of cells with 50 ppm of Triton QS-44 and Triton XQS-20 surfactants, at two different KOH levels.

The charge transfer (CT) resistance of cells with 50 ppm XQS-20 or 50 ppm QS-44 surfactant were compared, and the results may be seen in FIG. 6. The cells with XQS-20 have considerably higher CT resistance in both 26% KOH and 36% KOH anodes. With the same surfactant level in the anode, QS-44 should have a higher surface coverage on the Zn surface compared to XQS-20, due to the smaller molecular weight of QS-44. However, the XQS-20 anode exhibits a much higher CT resistance, indicating the chain length is the dominant factor for the suppression of anode discharge.

Figure 7:
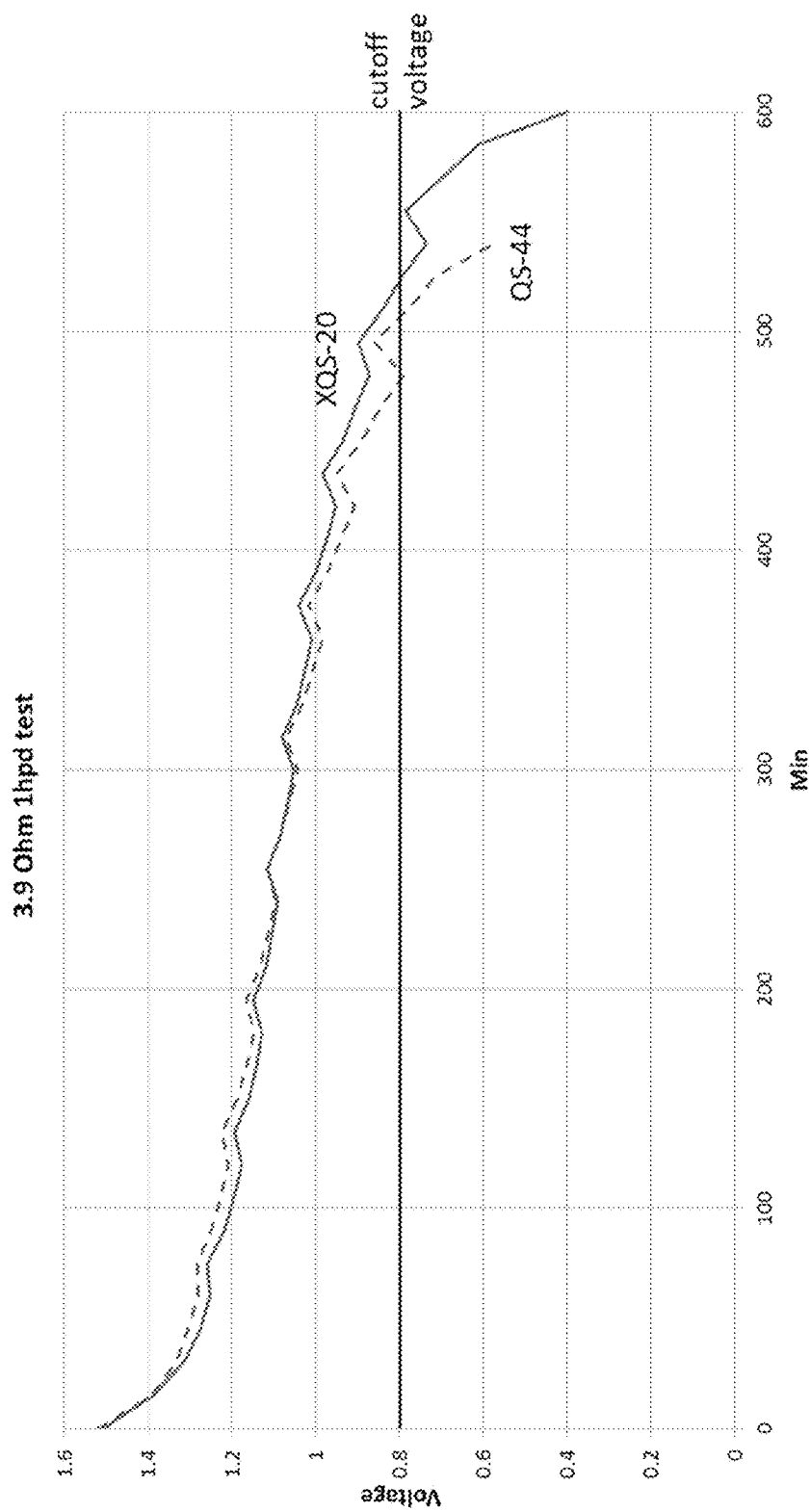
FIG. 7 shows 3.9 ohm 1 hpd discharge curves of cells with 50 ppm Triton XQS-20 and Triton QS-44.
Figure 8:
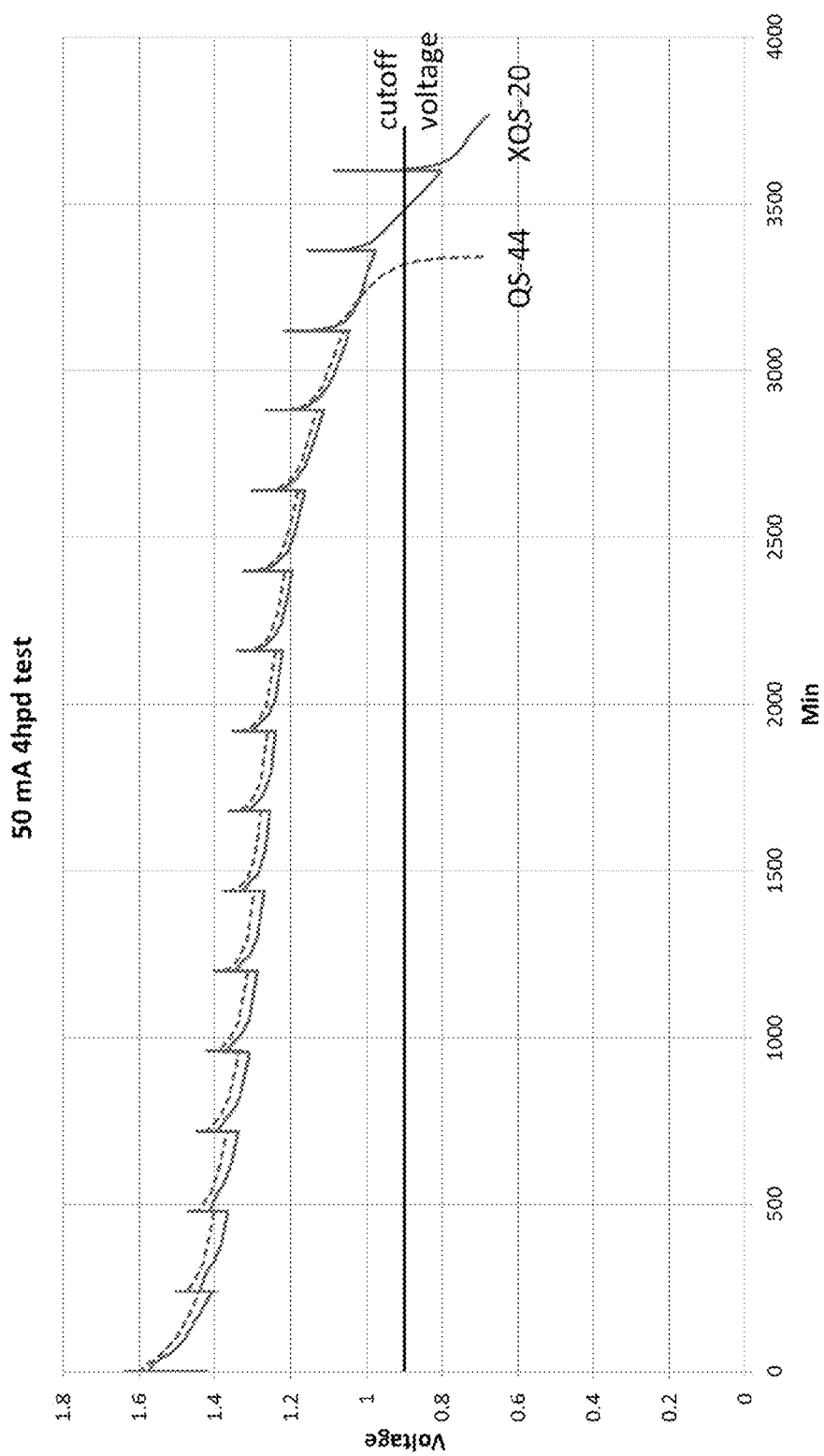
FIG. 8 shows 50 mA 4 hr/day discharge curves of cells with 50 ppm Triton XQS-20 and 50 ppm Triton QS-44 in the anodes.
Figure 9:
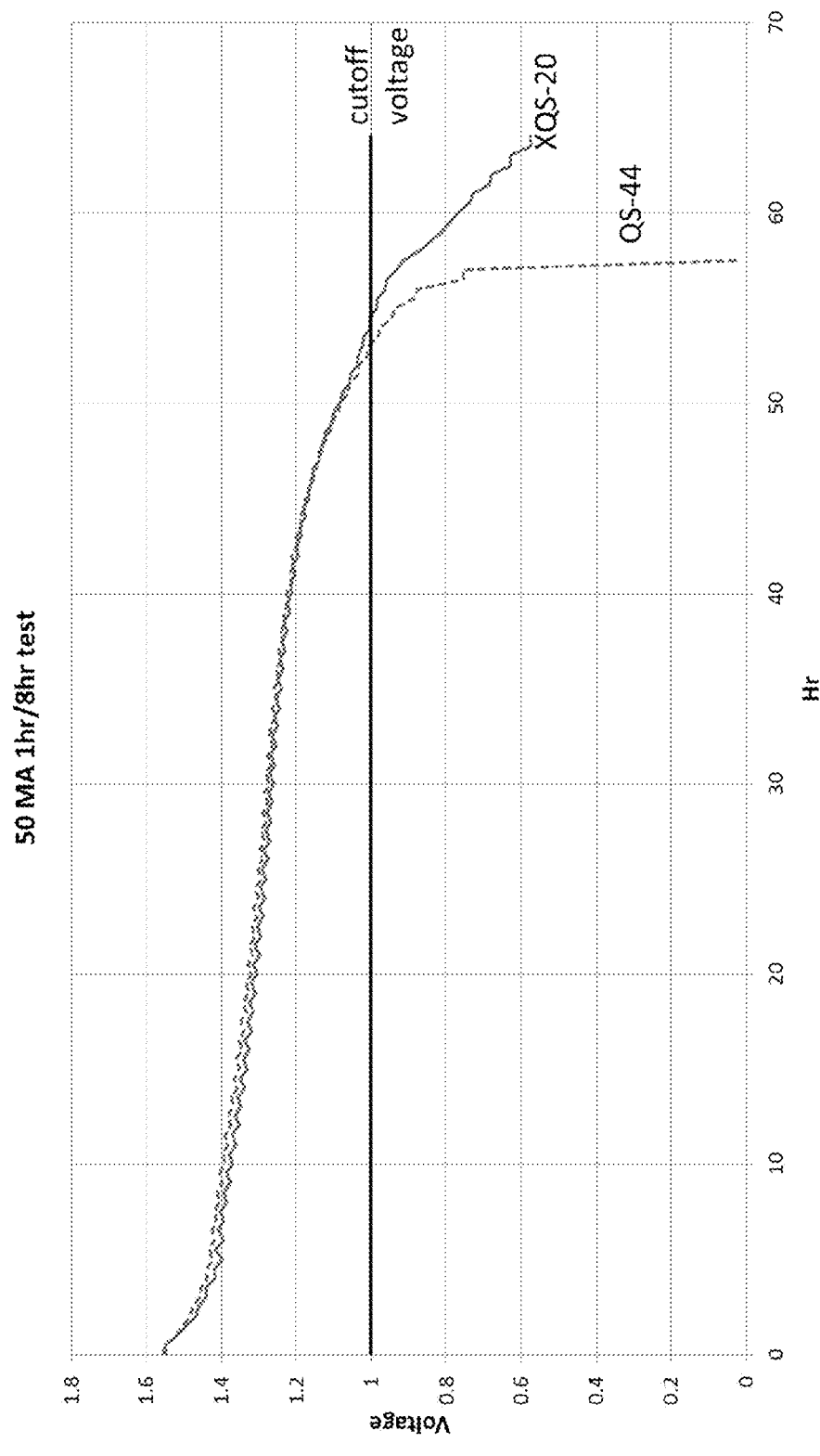
FIG. 9 shows 50 mA 1 hr/8 hrs discharge curves of cells with 50 ppm Triton XQS-20 and 50 ppm Triton QS-44 in the anodes.
Figure 10:
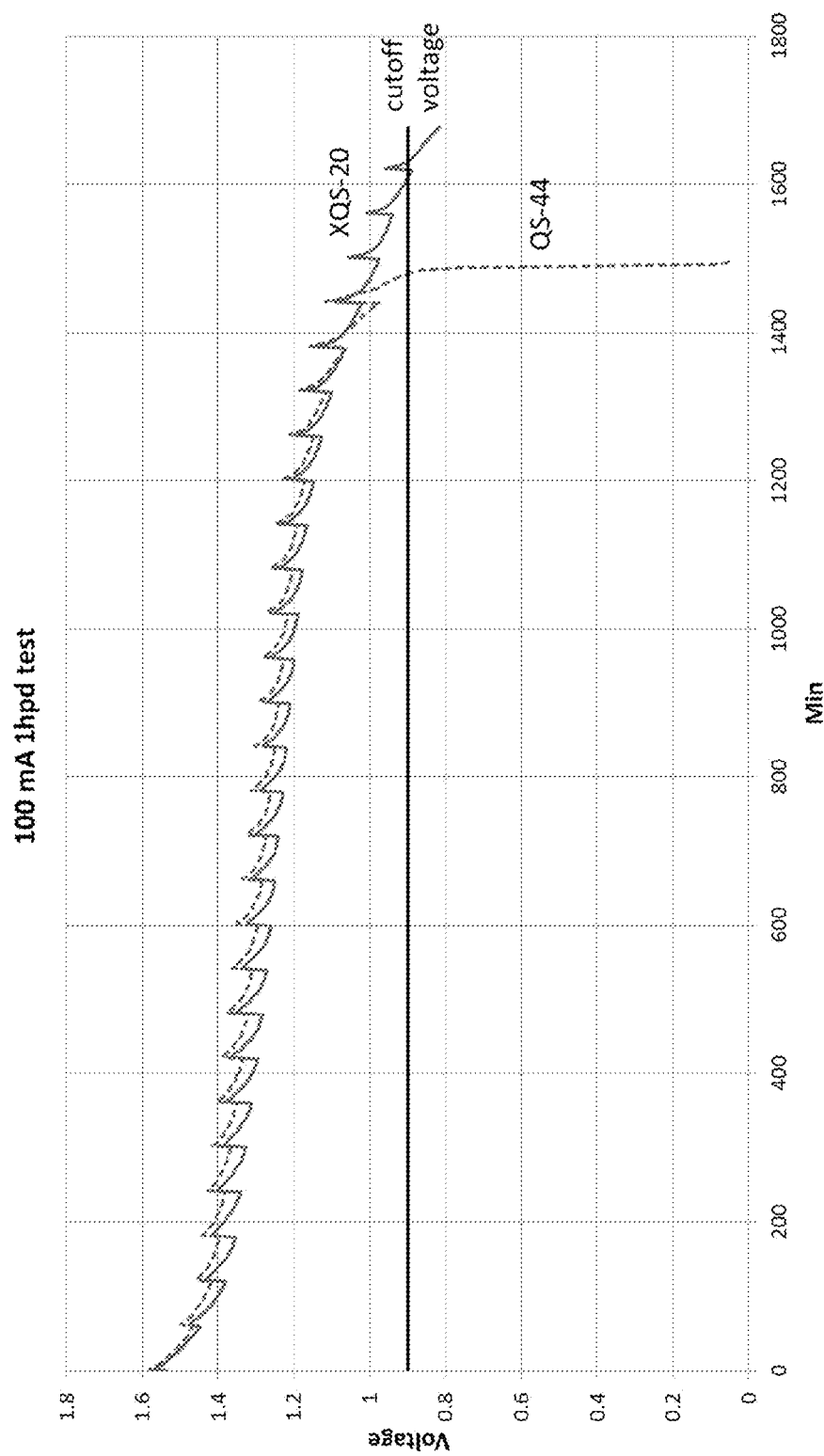
FIG. 10 shows 100 mA 1 hr/day discharge curves of cells with 50 ppm Triton XQS-20 and 50 ppm Triton QS-44 in the anodes.

The impact of chain length on anode shutdown is confirmed in the 3.9 ohm 1 hpd test, seen in FIG. 7. With the same concentration of surfactant level, the surfactant with the longer chain length (Triton XQS-20) exhibits advantages over QS-44 in delaying anode shutdown. In fact, the positive effect of long-chain surfactant was also observed in other tests, including a 50 mA 4 hr/day test (results shown in FIG. 8), a 50 mA 1 hr/8 hrs test (FIG. 9), and a 100 mA 1 hr/day test (FIG. 10).

Based on the discussion above, it seems clear that the long ethoxylate chain is the critical characteristic of XQS-20 surfactant for delaying anode shutdown; however, a minimum surfactant concentration is needed to maintain its effectiveness, as the long-chain surfactants generally have large molecular weights. Without reaching a certain level of surface coverage on the Zn surface, the surfactant may lose its function of delaying anode shutdown. As shown in FIG. 11, an anode shutdown issue still exists when the Triton XQS-20 surfactant level is 10 ppm. In a 10 ohm continuous test (results shown in FIG. 12), the surfactant level needs to be 30 ppm or above to avoid early anode shutdown. The long ethoxylate chain of Triton XQS-20 surfactant, in some cases, negatively impacts the high-drain test, due to suppression of anode discharge. The surfactant concentration and other anode parameters (i.e. KOH concentration, Zn concentration) need to be optimized to maximize the long-chain surfactant's benefit on overall service.

CONCLUSIONS

1. CT scan shows a dense ZnO layer is formed near the anode/separator interface for the cells with control surfactant (PE-510). The dense ZnO layer blocks the diffusion of electrolyte and $H_2O$ and consequently causes anode shutdown in 3.9 ohm 1 hpd test.

2. The Triton XQS-20 surfactant improves the 3.9 ohm 1 hpd service as it is able to delay the anode shutdown near the end of discharge.

3. The Triton XQS-20 surfactant delays anode shutdown because it allows uniform anode discharge across the anode, instead of localized discharge at the region close to the anode/separator interface. With the presence of Triton XQS-20 surfactant, the anode discharge is extended further away from the anode/separator interface due to its suppression on anode discharge.

4. The long ethoxylate chain is the major contributor of Triton XQS-20's capability on delaying anode shutdown. The long chain increases the charge transfer resistance of anode and slows down the anode discharge.

5. Triton XQS-20 surfactant also helps delay anode shutdown in other moderate and low drain tests (i.e. 100 mA 1 hpd, 50 mA 1 hr/8 hrs), which further confirms its capability on delaying anode shutdown.

6. Due to the high anode charge transfer resistance associated with its long ethoxylate chain, in some cases, Triton XQS-20 surfactant (50 ppm) negatively impacts the high-drain service (DSC and 750 mA grooming). The optimization of surfactant concentration and other anode parameters (i.e. KOH concentration, Zn concentration) is needed to maximize the benefit on overall service.

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims and list of embodiments disclosed herein. Although specific terms are employed herein, they are used in a generic and descriptive sense only and not for purposes of limitation. For the embodiments described in this application, each embodiment disclosed herein is contemplated as being applicable to each of the other disclosed embodiments.

What is claimed is:

1. An alkaline electrochemical cell, comprising:
   a) a container; and
   b) an electrode assembly disposed within the container and comprising a cathode, an anode, a separator located between the cathode and the anode, an alkaline electrolyte solution, and a long-chain surfactant, wherein the long-chain surfactant has the structure $R_1$—$(R_2Y)_n$—$R_3$, wherein $R_1$ is phenylalkyl,
   $R_2$ is ethylene,
   Y is O,
   $R_3$ is a phosphate ester or hydroxyl group, and
   $16 \leq n \leq 40$;
   wherein the alkaline electrochemical cell does not comprise more than one surfactant; and
   wherein the long-chain surfactant is in the anode.

2. The alkaline electrochemical cell of claim 1, wherein $R_3$ is a hydroxyl group.

3. The alkaline electrochemical cell of claim 1, wherein $30 \leq n \leq 40$.

4. The alkaline electrochemical cell of claim 1, wherein $R_3$ is a phosphate ester group.

5. The alkaline electrochemical cell of claim 1, wherein the long-chain surfactant has the structure

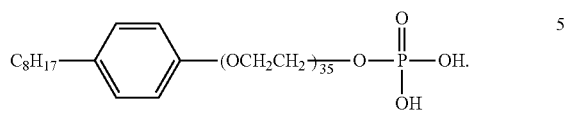

6. The alkaline electrochemical cell of claim 1, wherein the electrochemical cell is a primary cell.

7. The alkaline electrochemical cell of claim 1, wherein the electrochemical cell is a secondary cell.

8. The alkaline electrochemical cell of claim 1, wherein said alkaline electrolyte solution is aqueous.

* * * * *